(No Model.) 5 Sheets—Sheet 1.
A. SWASEY.
PROCESS OF CUTTING TEETH OF GEAR WHEELS.
No. 333,488. Patented Dec. 29, 1885.
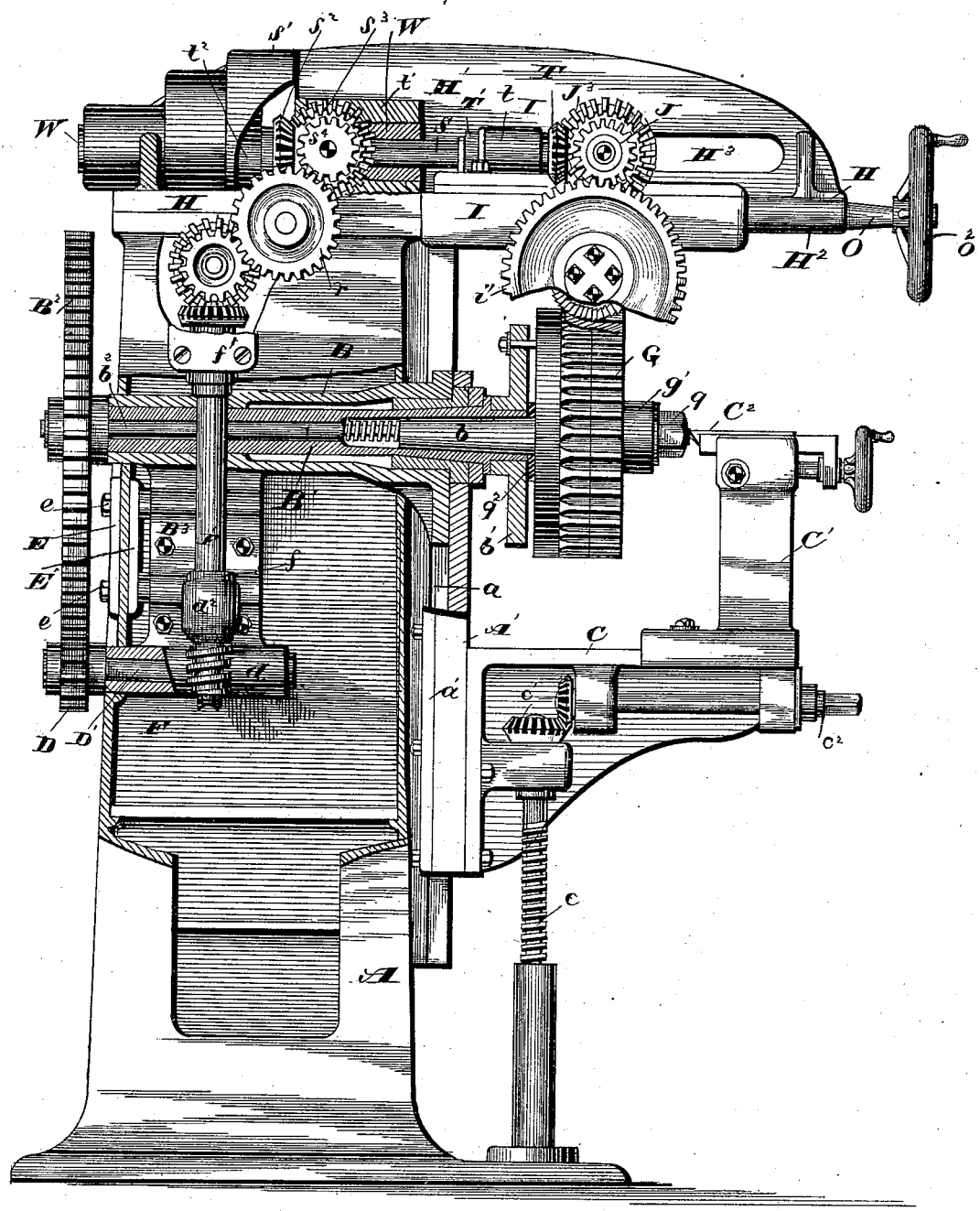

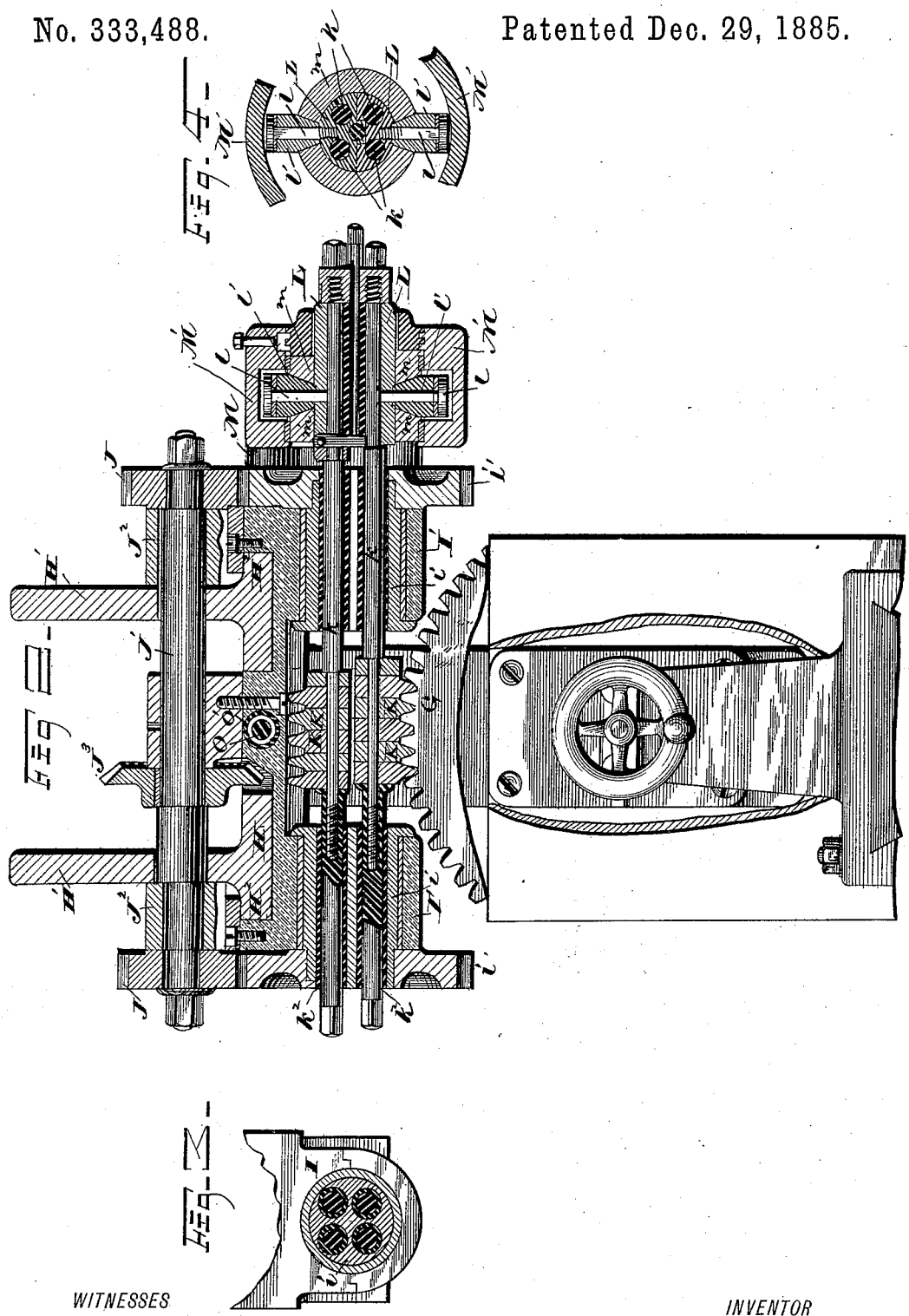

(No Model.) 5 Sheets—Sheet 3.

A. SWASEY.
PROCESS OF CUTTING TEETH OF GEAR WHEELS.

No. 333,488. Patented Dec. 29, 1885.

WITNESSES
Wm. M. Monroe,
Geo. W. King

INVENTOR
Ambrose Swasey
by
Leggett & Leggett
Attorneys (No Model.) 5 Sheets—Sheet 4.
A. SWASEY.
PROCESS OF CUTTING TEETH OF GEAR WHEELS.
No. 333,488. Patented Dec. 29, 1885.
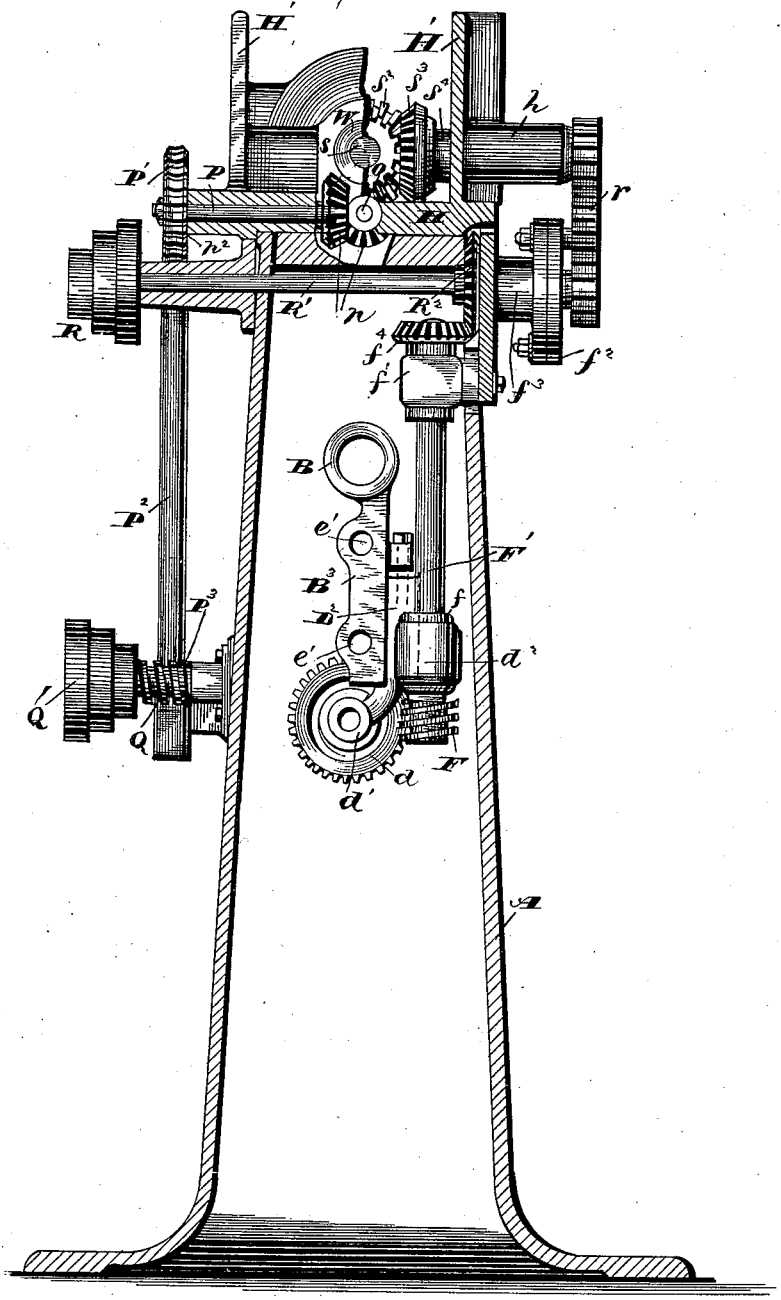
WITNESSES
INVENTOR
Ambrose Swasey
by
Leggett & Leggett
Attorneys (No Model.)
A. SWASEY.
PROCESS OF CUTTING TEETH OF GEAR WHEELS.
No. 333,488. Patented Dec. 29, 1885.
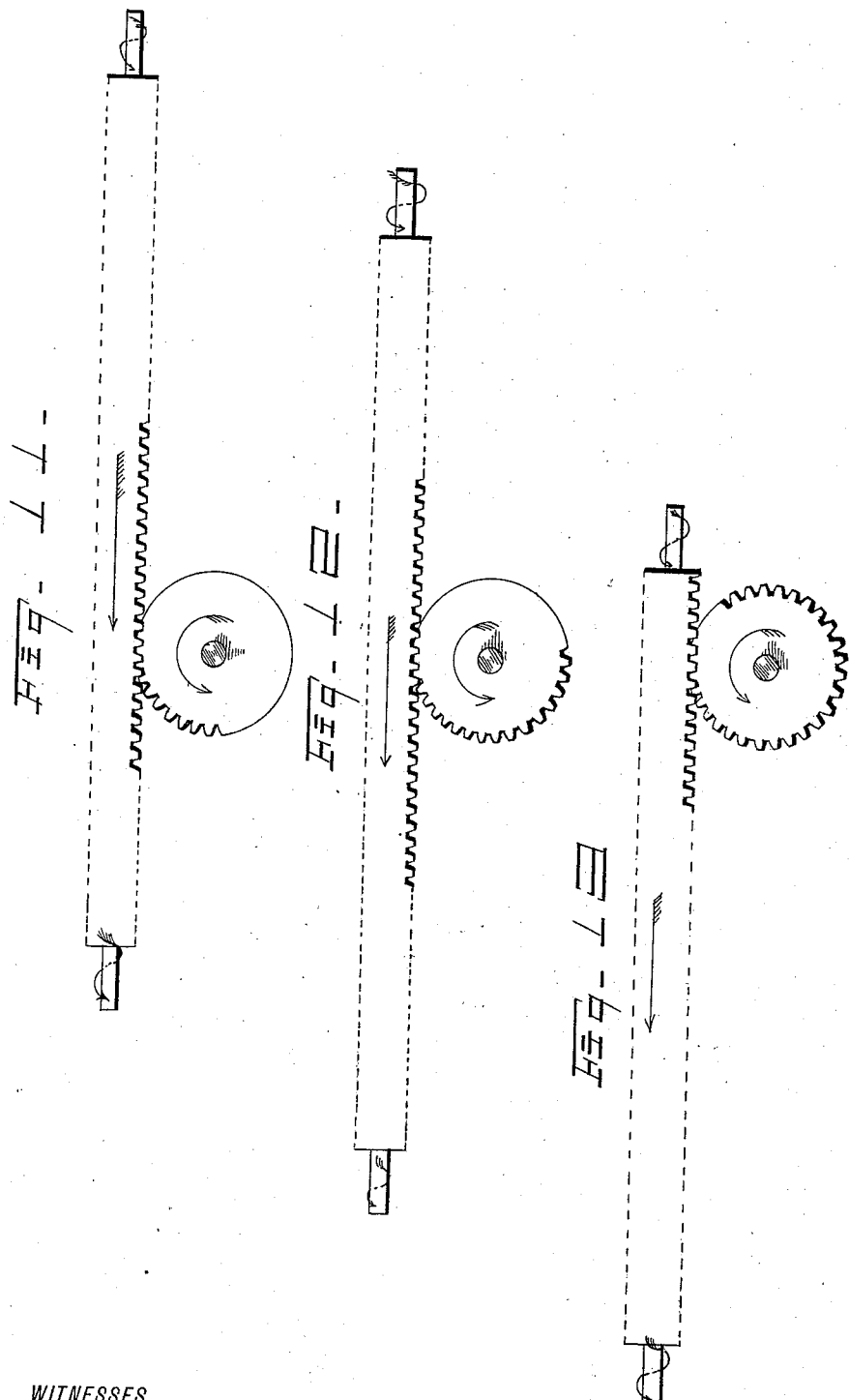
WITNESSES
INVENTOR

UNITED STATES PATENT OFFICE.

AMBROSE SWASEY, OF CLEVELAND, OHIO.

PROCESS OF CUTTING TEETH OF GEAR-WHEELS.

SPECIFICATION forming part of Letters Patent No. 333,488, dated December 29, 1885.

Application filed March 27, 1885. Serial No. 160,255. (No model.)

*To all whom it may concern:*

Be it known that I, AMBROSE SWASEY, of Cleveland, in the county of Cuyahoga and State of Ohio, have invented certain new and useful Improvements in Processes of Generating and Cutting Spur-Gear Wheels; and I do hereby declare the following to be a full, clear, and exact description of the invention, such as will enable others skilled in the art to which it pertains to make and use the same.

My invention relates to the process or method of generating and cutting spur-gear wheels; and it consists, essentially, in revolving the blank while its teeth are being cut therein, and at the same time moving the cutters bodily in the direction that the blank is revolving while said cutters are performing their cutting function.

In the accompanying drawings is illustrated one effective form of mechanism for carrying out my process, and its description will, it is believed, fully explain my said process.

Figure 5:
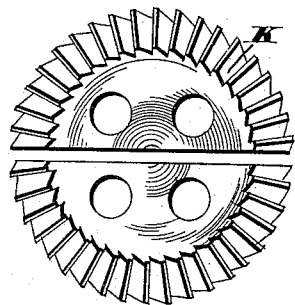
Figure 6:
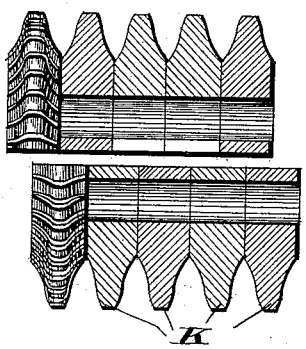
Figure 7:
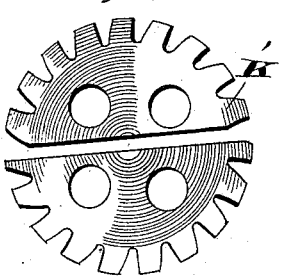
Figure 8:
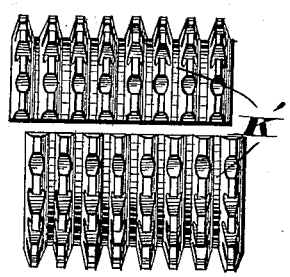
Figure 9:
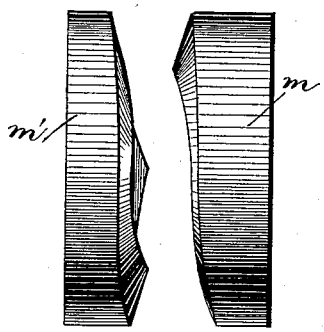

Figure 1 is a side elevation, partly in section, of my improved gear-cutting engine, with portions of the front wall broken away to show the internal construction. Fig. 2 is a front end elevation with the upper portion in section. Fig. 3 is an elevation, and Fig. 4 a vertical section in detail. Fig. 5 is a side elevation of a bisected cutter. Fig. 6 shows a set of five bisected cutters arranged in section, the left-hand cutter in elevation and the remaining four in section. Fig. 7 is a side elevation of a cutter with different teeth from that shown in Fig. 5. Fig. 8 is a side elevation of a series of eight cutters of the kind shown in Fig. 7, and arranged in two sections. Fig. 9 is a side elevation of the cams that reciprocate the cutters. Fig. 10 is a transverse vertical section of the supporting-frame, and, in elevation, the head and portions of the mechanism as seen from the rear end. Figs. 11, 12, and 13 are ideal or diagrammatic views illustrating the essential features and principles of my process. In these last three figures is represented the blank operated upon by a single cutter or series of cutters of a continuous length, at least equal to the circumference of the blank, and this cutter, while the blank is revolving, is made to revolve and move across the rim of the blank, and at the same time travel longitudinally in the same direction that the blank is revolving, thereby automatically generating and cutting the teeth by a continuous operation until all the teeth are formed.

A represents a supporting frame or column provided with the vertical ways $a$, on which operates the slide A', that is provided with suitable gibs, $a'$. To this slide is bolted on one side the sleeve B, in which is journaled the live-spindle B', and on the other side the bracket C, that supports the tail-stock C', with the dead-center $C^2$. The screw $c$, by means of the engaging-gears $c'$, is actuated from the outer end of the shaft $c^2$, and the bracket C, the slide A', and the sleeve B and attachments are vertically adjusted thereby.

In Fig. 1 the front brace of the bracket C is broken away to show the manner of supporting the screw and shaft $c^2$ from the bracket. The frame A has openings of some length on either end, through which pass the spindle B' and other parts that are moved by the screw $c$. The spindle B' is provided, in the usual manner, with the live-center $b$, and some driving device, usually a face-plate, $b'$, and may have a rod, $b^2$, extending outside of the spindle, as shown, and the inner end provided with a thread engaging a thread in the live-center, and by means of which the live-center $b$ may be backed out or drawn into the spindle. The live-center extends some distance beyond the spindle, and the forward end embraces the dead-center $C^2$, and is supported thereby, and this projecting part forms a mandrel on which the blanks G, one or more at a time, are mounted, and are pressed firmly by the nut $g$ and sleeve $g'$ against the collar $g^2$, by means of which the blank revolves with the live-center and spindle, aided by the driver $b'$, when necessary.

On the spindle B' is secured the gear $B^2$, engaging the pinion D, that is secured to the shaft D', on which is mounted the worm-gear $d$, engaging the worm F, that slides on and is driven by the vertical shaft F'. The sleeve B has a pendent arm, $B^3$, to which is secured the part $D^2$, that is provided with the boxes $d'$ for the shaft D', and with the box $d^2$, in which is journaled the hub of the worm F.

The upper end of this hub has an adjustable collar, $f$, preferably screwed onto the hub, by means of which the lost end motion of the worm may be taken up. The worm and shaft F and F' are provided in the usual manner with a feather in the one and a groove in the other. The shaft F' is journaled above in the box $f'$, and provided with suitable collars to hold it endwise. The lower end of the shaft is only supported by the said worm. By this arrangement of parts motion is transmitted from the gearing above to the spindle B', in whatever vertical position the spindle and connected parts may be adjusted by the screw $c$.

E and E' are plates that extend across the opening in the frame A, and embrace the edges thereof, and are pressed together by the bolts $e$, forming a clamp. The inner ends of these bolts are blanks and extend some distance into the holes $e'$ of the part $B^2$, and when the parts have been adjusted and the plates clamped onto the frame A these blanks act as steady-pins to prevent vibration of the sleeve B and attachments.

H is an overhanging head bolted to the frame A and strengthened by the ribs H'. The bottom and outer edges of the overhanging part form ways $H^2$, on which slides the frame I, that supports the cutters and attachments.

In Fig. 1 the front rib is broken away to show the mechanism located between the ribs. The frame I has pendent boxes I' on either end, in which are journaled the cylindrical block or spindles $i$, the outer ends of which project beyond the boxes, and have, respectively, attached the gears $i'$, that engage the pinions J on the shaft J', and by means of which the two spindles $i$ revolve in unison. The shaft J' is journaled in the boxes $J^2$, that are attached to the frame I. The shaft J' is provided with the beveled gear $J^3$, that engages a gear, T, on the driving-shaft S, hereinafter described. The shaft J' passes through the openings $H^3$ in the ribs H'. (Shown more clearly in Fig. 1.)

The cutters, of which two kinds are shown, K and K', are first turned in suitable shape, and preferably four holes are bored of equal diameter, and an equal distance from and parallel with the axis of the cutter and equidistant apart. The cutters are then severed with a narrow tool, so that when the severed parts or segments are in position to form a circle they are slightly separated, as shown in Figs. 5 and 7; or each segment may be made separately. The cutters K have to be turned up separately, in order to dress the teeth, and are then placed together in series, as shown in Figs. 2 and 6. The cutters K' may be turned up in a block, and then bisected, as shown in Fig. 8. The cutters are placed in series on the small ends of the rods $k$, that fit snugly in the holes of the cutters. The right-hand cutter abuts against the shoulder of the rod $k$, or against an intervening washer, if preferred. The left-hand ends of the rods $k$ screw into the ends of the rods $k^2$ until the latter press against the left-hand cutter or an intervening washer. The outer ends of these rods are square, so as to engage a wrench or crank, by means of which the cutter may be firmly secured. The rods $k$ and $k^2$ pass through holes in the respective spindles $i$, having an easy fit therein, so that the rods may slide endwise. The two sections of cutters have therefore an axis in common with and are revolved by the spindles $i$, and at the same time each section of the cutters, provided, as aforesaid, with its two sets of rods, may be reciprocated independently of the other section, the rods, as aforesaid, sliding in their respective bearings in the spindles $i$. The blanks G, as aforesaid, revolve slowly with the live-spindle, and a section of cutters, while engaging the blank in the process of cutting the same, is carried along with it in the manner that a rack would move along with an engaging-gear, except that the cutters are not moved by the blank, but by mechanism hereinafter described. When, by the revolving of the cutters, one section is free from its engagement with the blank, it is moved back endwise to the place of starting, while the other section takes its place in cutting.

The mechanism for reciprocating the sections of cutters will next be described. A divided cylindrical block, L, provided with suitable holes, is secured on the rods $k$ concentric with the cutters, and so arranged that each half of the block engages the rods that secure a section of cutters. Each half of the block L is provided with a stud, $l$, set radially and opposite each other, and on which are journaled, respectively, the rolls $l'$, that operate between the cams $m$ and $m'$. These cams are secured in an annular recess in the head M', that is attached by the arm M to the frame I. The faces of these cams for about three-quarters of the way around have lead like the thread of a screw and substantially equal to the pitch of the teeth to be cut on the blank. Around the remaining quarter the faces of the cams have a quick reverse curve to the place of starting. For example, if the teeth have a half-inch pitch, the pitch of the screw part of the cam would be one-half inch if continued around the cam; but as it extends only three-quarters of the way around the cam the throw of the cam in each direction will be only three-eighths of an inch. The arrangement of parts is such that when one of the rollers $l$ is engaging the screw part of the cam the section of the cutters that is reciprocated by this roller is cutting; but when this roller reaches the reverse curve of the cam its section will have passed from its engagement with the blank, and is free to be moved back to the starting-point. As the screw part of the cam extends, as aforesaid, more than half-way around the cam, the one roller will engage this part before the other roller has left it. This is necessary, from the fact that as the two sections of cutters are only slightly separated, the rear of the one section will continue to engage the blank some time after the front of the other section has commenced its work. The cutters are slowly advanced across the face of the blank by means of the feed-screw O, that engages a nut, O', in the sliding frame I. The front end of the screw O is provided with a hand-wheel, $O^2$, for moving the sliding frame I when the feed is thrown out, and the rear end is connected by the bevel-gears $p$ with the shaft P, that has attached a worm-gear, P', engaging a worm, $p^2$, on the vertical shaft $P^2$. The lower end of this shaft has the worm-gear $P^3$, that engages the worm Q on the same shaft with the cone Q', that is connected by a belt with the cone R on the shaft R'. On this shaft is the gear $R^2$, engaging the gear $f^4$ of the shaft F', that conveys motion to the live-spindle already described. It will be seen that the feed mechanism is actuated by the shaft from which power is transmitted to the live-spindle, and therefore the desired feed is had for the cutters for each revolution of the blank. The shaft R' extends through the hub $f^3$, to which is attached the arm $f^2$, that supports the change-gears $r$, that are of the usual construction. The shaft S in front is journaled in the box $t$, and is provided with the collar T' on the back side of the box and the gear T on the front side, by means of which the shaft moves endwise with the movement of the frame I. The gear T engages the gear $J^3$, already described. The rear end of the shaft S slides through the sleeve W, that is journaled in the boxes $t^2$ and $t'$. The sleeve and shaft are provided, in the usual manner, with a groove in the one and a feather in the other, by means of which they are made to revolve together. The driving-cone S' and the gear $S^2$ are mounted on the sleeve W. The gear $S^2$ engages the gear $S^3$ on the shaft $S^4$, that is journaled in the box $h$, and by means of which motion is transmitted to the change-gears $r$. The gears $J^3$, $S^2$, and $R^2$ may be reversed on their respective shafts, and be made to revolve with their respective engaging-gears in either direction, as may be required. For instance, these gears in Fig. 1 are shown in a reversed position from those shown in Figs. 2 and 10. The relative motions of the driving-shaft and cutters are positive, and no provision is made for changing them, while the motion of the blank, by means of the change-gears, is so regulated that the blank advances one tooth with each revolution of the cutters. As aforesaid, the throw of the cam forward, and consequently the movement of each section of the cutters forward, is about three-fourths of the pitch of the teeth, and we will suppose, as before, that the pitch is one-half inch; but some clearance must be allowed each section, both before the time and after its backward movement, and during a portion of the time that the one section is cutting the other section is cutting also, and the result is the blank is advanced one tooth for each revolution of the entire cutter. The blank, therefore, must make one revolution while the cutters revolve as many times as there are teeth to be cut in the blank.

One series of segmental cutters forming one section of cutters may be used alone, and instead of being about one-half of a circle, as shown in Figs. 5, 6, 7, and 8, it may be less than that portion of a circle, or enough less than a whole circle to allow the cutters to become disengaged from the revolving blank and be moved back to the place of starting; but in such cases the cutting would not be continuous, and therefore would not give as correct results; also, there may be more than two sections of cutters, but this would only add complication to the mechanism without any benefit accruing.

Many of the details of construction are omitted, for the reason that much of the mechanism employed is well known and in common use in a variety of machines.

When a set of cutters and corresponding cams have been prepared for a given pitch, gears of any number of teeth that are practicable to have in a gear may be cut, and they will all run correctly together.

What I claim is—

1. The process or method of generating and cutting spur-gear wheels herein described, consisting in revolving the blank while its teeth are being cut, and at the same time moving the cutters bodily in the direction that the blank is revolving while said cutters are performing their cutting function, substantially as set forth.

2. The process or method of generating and cutting spur-gear wheels herein described, and consisting, essentially, in simultaneously revolving a blank on its axis and feeding a series of cutters across the face of the blank to cut the teeth, and moving the cutters longitudinally in unison with the blank, substantially as set forth.

3. The process or method of generating and cutting spur-gear wheels herein described, and consisting, essentially, in simultaneously revolving a blank on its axis and feeding a series of revolving cutters across the face of the blank to cut the teeth, and moving the cutters longitudinally in unison with the blank, substantially as set forth.

4. The process or method of generating and cutting spur-gear wheels herein described, consisting, essentially, in cutting teeth in a revolving blank with a series of cutters revolving on an axis substantially at right angles to the axis of the blank, and causing the said cutters, while cutting, to move longitudinally at substantially the same speed as the pitch-line of the aforesaid blank, and in the same direction, substantially as set forth.

5. The process or method of cutting spur-gear wheels herein described, consisting, essentially, in feeding across the face of a revolving blank a series of cutters revolving on an axis substantially at right angles to the axis of the blank, and causing the said cutters, while cutting, to move endwise at substantially the same speed as the pitch-line of the aforesaid blank, and in the same direction, substantially as set forth.

In testimony whereof I sign this specification, in the presence of two witnesses, this 19th day of March, 1885.

AMBROSE SWASEY.

Witnesses:
CHAS. H. DORER,
ALBERT E. LYNCH.